J. ELIOT.
Horse Rake.
No. 75,006. Patented March 3, 1868.
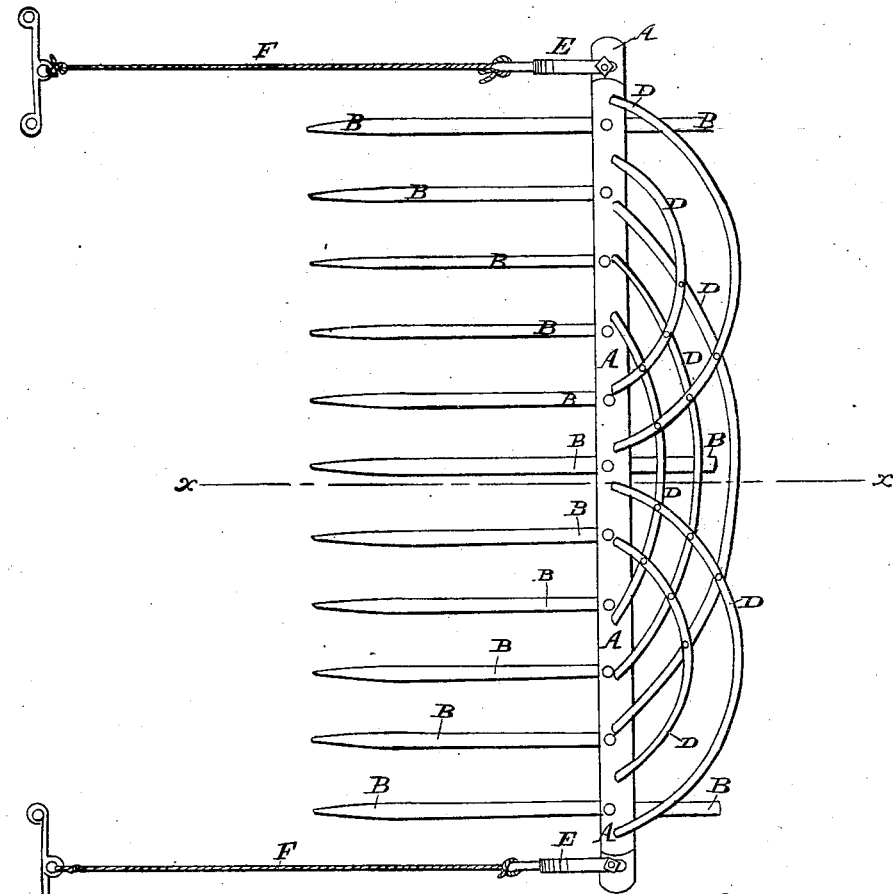
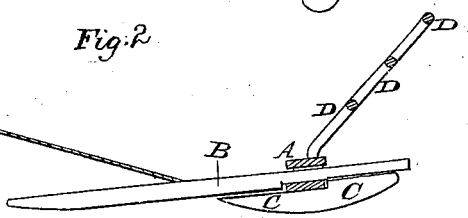

United States Patent Office.

JOHN ELIOT, OF VERMILLION, ILLINOIS.

*Letters Patent No. 75,006, dated March 3, 1868.*

IMPROVEMENT IN HORSE-RAKES.

*The Schedule referred to in these Letters Patent and making part of the same.*

TO ALL WHOM IT MAY CONCERN:

Be it known that I, JOHN ELIOT, of Vermillion, in the county of Edgar, and State of Illinois, have invented a new and improved Hay-Gatherer and Gleaner; and I do hereby declare that the following is a full, clear, and exact description thereof, which will enable others skilled in the art to make and use the same, reference being had to the accompanying drawings, forming part of this specification, in which—

Figure 1 is a top view of my improved machine.

Figure 2 is a vertical cross-section of the same, taken through the line $x\,x$, fig. 1.

Similar letters of reference indicate like parts.

My invention has for its object to furnish an improved machine, simple in construction, easily operated, and effective in operation, by which hay may be gathered and grain-fields gleaned quickly and thoroughly; and it consists in the combination of the rake-teeth, shoes or runners, beam, swinging clevises, bows and draught-ropes, with each other, as hereinafter more fully described.

A is the beam, a very convenient length for which is thirteen feet. To the beam A are securely attached the teeth B, which should project about five feet in front of the beam A, and should be at a suitable distance apart, according to the fineness of the hay for gathering which the machine is to be used. The end and central teeth, or any desired number, may project a little in the rear of the beam A, for convenience in attaching the shoes or runners C. The runners C, any desired number of which may be used, are attached to the under side of the beam A and to the teeth B, and their lower sides are curved or bevelled off at both ends, as shown in fig. 2, so that the machine may be drawn with equal facility in either direction. To the upper side of the beam A are attached bows D, or their equivalent, projecting upward and inclined backward, as shown in figs. 1 and 2, to keep the collected hay or grain from being forced off at the rear side of the machine, and which serve as handles, when required, for handling or grinding the said machine. E are clevises, which are pivoted to the ends of the beams A, in such a way that they will turn or swing around the ends of the said beam, so that, by turning the horses and driving them in the opposite direction, the machine will be withdrawn from the load, leaving it untangled, so that it may be easily handled with a fork operated by hand or power, as may be desired. To the clevises E are attached the ends of the draught-ropes F, to the other ends of which the horses are attached. The ropes F, for a machine of the dimensions herein given, should be about ten feet long.

When the machine has been unloaded and drawn back to the place of loading, by driving one horse around the other, the machine will be brought into the proper position for being loaded. In operating the machine, a small boy is required to ride each horse, and upon rough ground a boy or man will be required to guide the machine when starting. At other times the load will be so balanced that the machine will not need to be guided.

I claim as new, and desire to secure by Letters Patent—

The hay-gatherer, when provided with teeth B, having the rearward extensions, to the under side of which and the head A the runners C are secured, as herein shown and described.

JOHN ELIOT.

Witnesses:
ALANSON BURSON,
N. SANDFORD.